US009766981B2

(12) United States Patent
Wang et al.

(10) Patent No.: US 9,766,981 B2
(45) Date of Patent: Sep. 19, 2017

(54) SYNCHRONIZATION APPARATUS, METHOD, AND NON-TRANSITORY COMPUTER READABLE STORAGE MEDIUM

(71) Applicant: Institute For Information Industry, Taipei (TW)

(72) Inventors: Ko-Yang Wang, Taipei (TW); Yen-Hung Kuo, Taipei (TW); Yu-Lin Jeng, Tainan (TW)

(73) Assignee: Institute For Information Industry, Taipei (TW)

( * ) Notice: Subject to any disclaimer, the term of this patent is extended or adjusted under 35 U.S.C. 154(b) by 566 days.

(21) Appl. No.: 14/300,955

(22) Filed: Jun. 10, 2014

(65) Prior Publication Data

US 2015/0355853 A1 Dec. 10, 2015

(51) Int. Cl.
*G06F 17/30* (2006.01)
*G06F 11/14* (2006.01)

(52) U.S. Cl.
CPC .................................. *G06F 11/14* (2013.01)

(58) Field of Classification Search
USPC .................. 707/610, 620, 624, 634
See application file for complete search history.

(56) References Cited

U.S. PATENT DOCUMENTS

| 6,826,662 | B2 | 11/2004 | Suzuoki et al. |
|---|---|---|---|
| 7,490,109 | B1 | 2/2009 | Sikchi et al. |
| 7,702,692 | B2 | 4/2010 | Chandrasekaran |
| 7,725,922 | B2 | 5/2010 | Pouliot |
| 7,908,653 | B2 | 3/2011 | Brickell et al. |
| 7,941,813 | B1 | 5/2011 | Protassov et al. |
| 7,979,891 | B2 | 7/2011 | Smithline |
| 8,180,893 | B1 | 5/2012 | Spertus |
| 8,224,796 | B1 | 7/2012 | Shinde et al. |
| 8,224,934 | B1 | 7/2012 | Dongre et al. |
| 8,275,791 | B2 | 9/2012 | Raffaele et al. |
| 8,448,255 | B2 | 5/2013 | Jothimani |
| 8,468,600 | B1 | 6/2013 | Kaskel et al. |
| 8,528,083 | B2 | 9/2013 | Lewis |
| 8,601,579 | B2 | 12/2013 | Krstić et al. |
| 8,627,451 | B2 | 1/2014 | Walsh et al. |
| 8,805,951 | B1 * | 8/2014 | Faibish ................ G06F 9/5072 709/213 |

(Continued)

*Primary Examiner* — Hanh Thai
(74) *Attorney, Agent, or Firm* — Skaar Ulbrich Macari, P.A.

(57) ABSTRACT

A context-awareness synchronization apparatus, method, and non-transitory computer readable storage medium are provided. The synchronization apparatus is electrically connected to a storage server via a network. The synchronization apparatus executes an operating system and an agent program installed on the operating system. The agent program configures a first and second individual spaces within the synchronization apparatus, determines a context of the synchronization apparatus, selects a first and second policy sets from a plurality of policy sets for the first and second individual spaces according to the context respectively, and handles the first and second individual spaces according to the first and second policy sets respectively. The first and second individual spaces are unaware of each other and only recognized by the agent program installed on the operating system. Each of the first and second policy sets includes a rule regarding synchronization between an individual space and the storage server.

21 Claims, 5 Drawing Sheets

(56) References Cited

U.S. PATENT DOCUMENTS

| | | | |
|---|---|---|---|
| 8,850,516 B1* | 9/2014 | Hrebicek | G06F 17/30174 |
| | | | 707/610 |
| 9,183,205 B1* | 11/2015 | Kurne | G06F 17/30073 |
| 2002/0133491 A1* | 9/2002 | Sim | G06F 17/30067 |
| 2003/0154238 A1* | 8/2003 | Murphy | H04L 12/24 |
| | | | 709/201 |
| 2003/0225801 A1* | 12/2003 | Devarakonda | G06F 17/30315 |
| 2006/0015690 A1* | 1/2006 | Boutboul | G06F 17/30212 |
| | | | 711/154 |
| 2006/0129562 A1* | 6/2006 | Pulamarasetti | G06F 17/30008 |
| 2006/0259901 A1* | 11/2006 | Kaplan | G06F 17/30085 |
| | | | 717/168 |
| 2006/0271600 A1* | 11/2006 | Goh | G06Q 10/06 |
| 2007/0220220 A1* | 9/2007 | Ziv | G06F 3/0605 |
| | | | 711/159 |
| 2011/0078333 A1* | 3/2011 | Jakubowski | H04L 67/1095 |
| | | | 709/248 |
| 2012/0290535 A1* | 11/2012 | Patel | G06F 11/2094 |
| | | | 707/634 |
| 2013/0332505 A1* | 12/2013 | Karandikar | H04L 67/1002 |
| | | | 709/202 |
| 2014/0007254 A1 | 1/2014 | Bukurak et al. | |
| 2014/0081911 A1* | 3/2014 | Deshpande | G06F 11/1448 |
| | | | 707/610 |
| 2015/0172120 A1* | 6/2015 | Dwarampudi | G06F 3/06 |
| | | | 709/221 |
| 2015/0286537 A1* | 10/2015 | Klose | G06F 11/1464 |
| | | | 707/652 |
| 2015/0350371 A1* | 12/2015 | Woods | H04L 67/2852 |
| | | | 707/620 |

\* cited by examiner

SYNCHRONIZATION APPARATUS, METHOD, AND NON-TRANSITORY COMPUTER READABLE STORAGE MEDIUM

FIELD

The present invention relates to synchronization apparatus, method, and non-transitory computer readable storage medium; more particularly, the present invention relates to context-awareness synchronization apparatus, method, and non-transitory computer readable storage medium.

BACKGROUND

Due to the rapid development of technology, people nowadays tend to use electronic devices (e.g. computers, digital cameras, etc.) to record various kinds of information. In the meantime, with the emergence of different types of data storage media (e.g. external portable hard drives, universal serial bus (USB) drives, storage servers, etc.), people can copy and/or make backups of electronic objects (e.g. files, folders, etc.) easily.

From the viewpoint of enterprises, electronic objects created and received by employees of an enterprise are intellectual property of this enterprise. Hence, the easier that an electronic object can be copied and/or be made backups, the higher possibility that intellectual property of enterprises will be leaked out. To secure intellectual property, technologies such as remote desktop services, web-based editing tools, and digital right management have been developed. Each of these technologies is briefly discussed below.

Regarding the technology of remote desktop services, a remote desktop client application has to be installed on a client device. On the client device, a user can view or even control the desktop session on another remote machine, where the remote desktop server is running. A remote desktop service provides a secure environment, where is capable for almost all applications and corresponding functions by a network control session manner. However, remote desktop services are protocol dependent, and they may have poor performance and heavily consume network bandwidth. When the network is congested, the performance of a remote desktop service will be degraded dramatically. Regarding web-based editing tools, they support fewer data types and have fewer functions comparing to legacy editing tools. As to digital right management (DRM) used by Apple's iTunes store, Google's Play store, etc., only true closed platform can protect electronic objects and resources, but users may resistant in using such kinds of DRM technologies when control policies of true closed platforms hurting conveniences of using the DRM protected applications.

According to the above descriptions, technologies such as remote desktop services, web-based editing tools, and digital right management all have shortcomings and cannot be adapted to the context that a client device is placed. Therefore, technologies that are context aware and that can easily copy and/or make backups of electronic files as well as secure intellectual property are still in an urgent need.

SUMMARY

An objective of certain embodiments of the present invention includes providing a synchronization apparatus, which comprises a storage unit, a network interface, and a processing unit. The storage unit is stored with a plurality of policy sets. The network interface is electrically connected to a storage server via a network. The processing unit is electrically connected to the storage unit and the network interface. The processing unit is configured to execute an operating system and execute an agent program installed on the operating system. The agent program configures a first individual space and a second individual space within the storage unit, determines a context of the synchronization apparatus, selects a first policy set and a second policy set from the policy sets for the first individual space and the second individual space according to the context respectively, and handles the first individual space and the second individual space according to the first policy set and the second policy set respectively. The first individual space and the second individual space are only recognized by the agent program installed on the operating system. The first individual space and the second individual space are unaware of each other. The first policy set comprises a first rule regarding synchronization between the first individual space and the storage server, while the second policy set comprises a second rule regarding synchronization between the second individual space and the storage server.

Another objective of certain embodiments of the invention includes providing a synchronization method for use in an electronic device. The electronic device is electrically connected to a storage server via a network. The synchronization method comprises the steps of: (a) executing an operating system, (b) executing an agent program installed on the operating system, (c) configuring a first individual space and a second individual space within the electronic device by the agent program, (d) determining a context of the electronic device by the agent program, selecting a first policy set and a second policy set from the policy sets for the first individual space and the second individual space according to the context respectively by the agent program, and (e) handling the first individual space and the second individual space according to the first policy set and the second policy set respectively by the agent program. The first individual space and the second individual space are only recognized by the agent program installed on the operating system, the first individual space and the second individual space are unaware of each other. The first policy set comprises a first rule regarding synchronization between the first individual space and the storage server, while the second policy set comprises a second rule regarding synchronization between the second individual space and the storage server.

Yet a further objective of certain embodiments of the invention includes providing a non-transitory computer readable storage medium, which has a computer program stored therein. The computer program executes a synchronization method after being loaded into an electronic device. The electronic device is electrically connected to a storage server via a network. The synchronization method comprises the following steps of: (a) executing an operating system, (b) executing an agent program installed on the operating system, (c) configuring a first individual space and a second individual space within the electronic device by the agent program, (d) determining a context of the electronic device by the agent program, selecting a first policy set and a second policy set from the policy sets for the first individual space and the second individual space according to the context respectively by the agent program, and (e) handling the first individual space and the second individual space according to the first policy set and the second policy set respectively by the agent program. The first individual space and the second individual space are only recognized by the agent program installed on the operating system, the first individual space and the second individual space are unaware of each other. The first policy set comprises a first rule regarding synchronization between the first individual space and the storage server, while the second policy set comprises a second rule regarding synchronization between the second individual space and the storage server.

Briefly speaking, the present invention includes an agent program installed and executed on an operating system. The agent program configures a plurality of individual spaces in the synchronization apparatus (or electronic device), wherein the individual spaces are unaware of each other and only recognized by the agent program. The agent program determines a context of the synchronization apparatus (or electronic device), selects a policy set for each of the individual spaces according to the context, and handles each of the individual spaces according to the selected corresponding policy set. For each of the individual spaces, the selected policy set comprises a rule regarding synchronization between the individual space and the storage server.

From the viewpoint of all the individual spaces, different individual spaces in the synchronization apparatus (or electronic device) may correspond to different policy sets under the same context. From the viewpoint of one single individual space, an individual space may correspond to different policy sets under different contexts. With these technical characteristics, the agent program can assist users/enterprises using the synchronization apparatus (or electronic device) manage their objects (e.g. files and/or folders) in different individual spaces in a flexible and context-awareness fashion. Diverse and context-awareness intellectual property management therefore can be achieved.

The detailed technology and preferred embodiments implemented for the subject invention are described in the following paragraphs accompanying the appended drawings for people skilled in this field to well appreciate the features of the claimed invention.

DETAILED DESCRIPTION

In the following descriptions, the synchronization apparatus, method, and non-transitory computer readable storage medium thereof will be explained with reference to example embodiments thereof. Nevertheless, these example embodiments are not intended to limit the present invention to any specific example, embodiment, environments, applications, or implementations described in these example embodiments. Therefore, the description of these example embodiments is only for the purpose of illustration rather than to limit the scope of the present invention. It shall be appreciated that elements not directly related to the present invention are omitted from depictions in the following embodiments and attached drawings.

Figure 1:
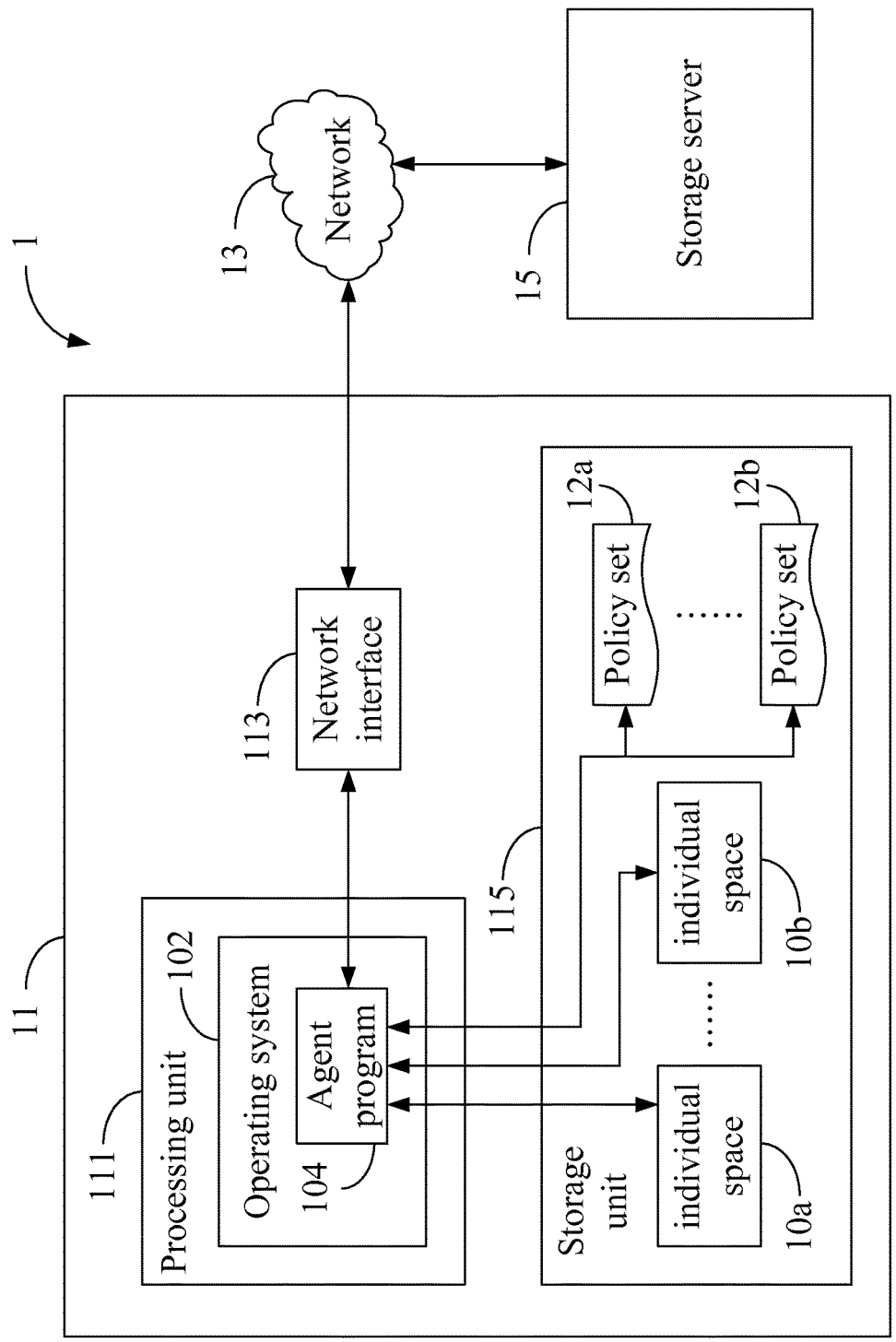
FIG. 1 is a schematic view of the system of a first embodiment of the present invention.

A first embodiment of the present invention is a system 1 for context-awareness management and synchronization, a schematic view of which is illustrated in FIG. 1. The system 1 comprises a synchronization apparatus 11, a network 13, and a storage sever 15. The synchronization apparatus 11 comprises a processing unit 111, a network interface 113, and a storage unit 115. The processing unit 111 is electrically connected to the network interface 113 and the storage unit 115, while the network interface 113 is electrically connected to the storage server 15 via the network 13.

The processing unit 111 may be any of various processors, central processing units (CPUs), microprocessors, or other computing devices well known to those of ordinary skill in the art. The network interface 113 may be any network interface that is capable of receiving and transmitting signals through various kinds of network. The storage unit 115 may be a memory, a Universal Serial Bus (USB) disk, a hard disk, a compact disk (CD), a mobile disk, a magnetic tape, a database, or any other storage media or circuit with the same function and well known to those of ordinary skill in the art.

The processing unit 111 executes an operating system 102 and executes an agent program 104 installed on the operating system 102. In other words, the agent program 104 is running on top of the operating system 102; the agent program 104 is one layer above the operating system 102. The agent program 104 configures a plurality of individual spaces 10a, . . . , 10b within the storage unit 115. It is emphasized that the individual spaces 10a, . . . , 10b are only recognized by the agent program 104 installed on the operating system 102. Therefore, the individual spaces 10a, . . . , 10b are unaware of each others and any other application installed on the operating system 102 in the synchronization apparatus 11 is unaware of the existence of the individual spaces 10a, . . . , 10b.

The storage unit 115 is stored with a plurality of policy sets 12a, . . . , 12b. In some other embodiments, the policy sets 12a, . . . , 12b may be synchronized from the storage server 15 by the agent program 104 through the network interface 113. Each of the policy sets 12a, . . . , 12b comprises at least a rule (not shown) regarding synchronization between an individual space and the storage server 15. For example, a rule (not shown) regarding synchronization may indicate that synchronization between an individual space and the storage server 15 is prohibited. Yet as another example, a rule (not shown) regarding synchronization may indicate that synchronization between an individual space and the storage server 15 should be performed regularly, should be performed when the object(s) has been modified or created in the individual space, should be performed when a scheduled time comes, should be performed under certain condition(s), and/or etc.

In addition, each of the policy sets 12a, . . . , 12b may be further related to at least a visibility of an individual space, such as the individual space is visible under some context(s) of the synchronization apparatus 11 and/or the individual space is invisible under some other context(s) of the synchronization apparatus 11. Moreover, each of the policy sets 12a, . . . , 12b may be further related to at least one of a visibility, a read operation, a write operation, a delete operation, and/or a modify operation of the object(s) stored in an individual space. For example, there may be a rule (not shown) comprised in the policy sets 12a, . . . , and/or 12b that indicates the object(s) stored in an individual space can be performed read operation(s) under some context(s) of the synchronization apparatus 11. Yet as another example, there may be another rule (not shown) comprised in the policy sets 12a, . . . , and/or 12b that indicates the object(s) stored in an individual space can be performed read operation(s), delete operation(s), and modify operation(s) under some context(s) of the synchronization apparatus 11. It is emphasized that different users/enterprises may require different security levels; hence, the content and types of the policy sets 12a, . . . , 12b may vary from case to case and cannot be listed exhaustively.

The agent program 104 determines a context (not shown) of the synchronization apparatus 11. To be more specific, the agent program 104 may determine the context (not shown) of the synchronization apparatus 11 according to at least an interface of the synchronization apparatus 11. In the present invention, an interface of the synchronization apparatus 11 is an element, a unit, a device, or the like of the synchronization apparatus 11 that can derive a piece of information regarding the environment that the synchronization apparatus 11 is placed. For example, an interface may be the network interface 113, a proximity sensor, a G-sensor, a thermal sensor, a touch-screen, a keyboard, a mouse, a universal serial bus, or a camera comprised in the synchronization apparatus 11. Different interfaces provide different pieces of information. For example, when the interface is the network interface 113, the piece of information used for determining the context may include the traffic of the network 13, an Internet Protocol (IP) address of the synchronization apparatus 11, the domain name of the network that the synchronization apparatus 11 is in, the conference room that the synchronization apparatus 11 is in, and/or etc. Yet as another example, when the interface is a keyboard, the piece of information used for determining the context may include the identity inputted by the keyboard. It is emphasized that the types of interfaces and the types of pieces of information gathered by the interfaces may vary from case to case and, hence, cannot be listed exhausted.

After the agent program 104 determines the context of the synchronization apparatus 11, the agent program 104 selects a policy set for each of the individual spaces 10a, . . . , 10b according to the context (not shown) and handles each of the individual spaces 10a, . . . , 10b according to the corresponding policy set. For example, the agent program 104 selects the policy set 12a for the individual space 10a according to the context (not shown) and then handles the individual space 10a according to the policy set 12a. Yet as another example, the agent program 104 selects the policy set 12b for the individual space 10b according to the context (not shown) and then handles the individual space 10b according to the policy set 12b.

When the synchronization apparatus 11 is moved to another place, the agent program 104 determines a new context (not shown) of the synchronization apparatus 11, selects a new policy set for each of the individual spaces 10a, . . . , 10b according to the new context (not shown), and handles each of the individual spaces 10a, . . . , 10b according to the corresponding new policy set.

Briefly speaking, the agent program 104 can configure multiple individual spaces that are only recognized by the agent program 104 installed on the operating system 102, determine a context of the synchronization apparatus 11, select a policy set for each of the individual spaces according to the context, and handle each of the individual spaces according to the selected corresponding policy set. From the viewpoint of all the individual spaces, different individual spaces in the synchronization apparatus 11 may correspond to different policy sets under the same context. From the viewpoint of one single individual space, an individual space may correspond to different policy sets under different contexts. With these technical characteristics, the agent program 104 can assist users/enterprises using the synchronization apparatus 11 manage their objects (e.g. files and/or folders) in different individual spaces in a flexible and context-awareness fashion. Diverse and context-awareness intellectual property management therefore can be achieved.

Figure 2:
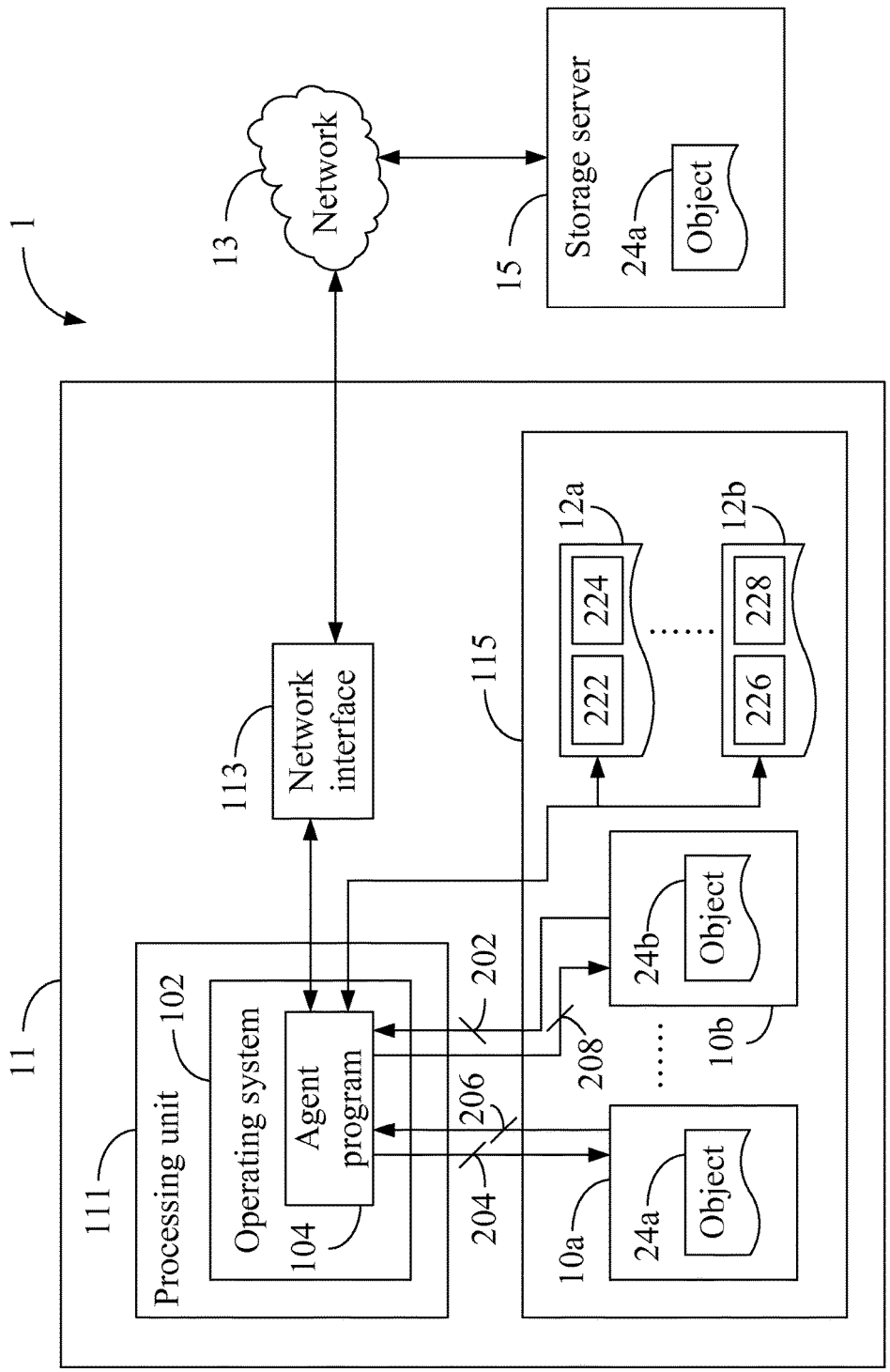
FIG. 2 is a schematic view of the system of a second embodiment of the present invention.

Please refer to FIG. 2 for a second embodiment of the present invention, which is also a system 1 for context-awareness management and synchronization. In the second embodiment, the synchronization apparatus 11 is able to execute the operations, have the functionalities, and achieve the same technical results as those described in the first embodiment. In the following descriptions, only the differences between the first embodiment and the second embodiment are addressed.

In this embodiment, the individual space 10a is stored with an object 24a (e.g. a file or a folder) having a security level (e.g. 3). It is assumed that the synchronization apparatus 11 is placed in the office by the user at the beginning. The agent program 104 figures out the domain name of the network according to information gathered by the network interface 113. Then, the agent program 104 determines a context (not shown) of the synchronization apparatus 11 according to the domain name of the network. For example, the context (not shown) may be the domain name itself, a status indicating that the synchronization apparatus 11 is placed in the office or a conference room, or the like.

Next, the agent program 104 selects a policy set for each of the individual spaces 10a, . . . , 10b according to the context and then handles each of the individual spaces 10a, . . . , 10b according to the corresponding policy set. The details will be given below. Nevertheless, the following descriptions will focus on only the individual spaces 10a, 10b for convenience.

The agent program 104 respectively selects the policy sets 12a, 12b for the individual spaces 10a, 10b according to the context (not shown). In this embodiment, the policy set 12a comprises two rules 222, 224. The rule 222 indicates that the object(s) stored in the individual space 10a and having a security level greater than a predetermined threshold (e.g. 2) should be synchronized to the storage server 15 by the agent program 104 through the network interface 113 whenever the object(s) is created or modified, while the rule 224 indicates that the object(s) stored in the individual space 10a can be performed a read operation and a modified operation. The policy set 12b comprises two rules 226, 228. The rule 226 indicates that object(s) can be written into the individual space 10b, while the rule 228 indicates that object(s) in the individual space 10b should be synchronized to the storage server 15 once an object has been created or modified. Although each of the policy sets 12a, 12b comprises two rules, the present invention does not limit the number of the rules in a policy set.

Afterwards, the agent program 104 handles the individual space 10a and the individual space 10b according to the policy set 12a and the policy set 12b, respectively. Based on the rule 222 comprised in the policy set 12a, the agent program 104 determines that the object 24a has a security level greater than the predetermined threshold and then synchronizes the object 24a to the storage server 15 through the network interface 113. Meantime, the agent program 104 monitors every input/output operation intending to access the individual spaces 10a, 10b so that the rule 224 comprised in the policy set 12a and the rules 226, 228 comprised in the policy set 12b can be performed when there is a need.

Although the individual space 10a and the individual space 10b are unaware of each other, the individual space 10b may attempt to access the object(s) stored in the individual space 10a by an application (not shown) installed on the operating system 102 or under the control of the user, and vice versa. When the individual space 10b attempts to access the object 24a stored in the individual space 10a, the agent program 104 receives an access request 202 of the individual space 10a from the individual space 10b by intercepting the access request 202. Then, the agent program 104 determines whether the access request 202 is allowed according to the appropriate rule(s) of the appropriate policy set(s). It is noted that the rule(s) used for determining whether the access request 202 is allowed depends on the content of the access request 202. If the agent program 104 determines that the access request 202 is allowed, the agent program 104 further translates the access request 202 into an access request 204 that can be understood by the individual space 10a. The agent program 104 then executes the access request 204 in the individual space 10a and derives an execution result after executing the access request 204. It is noted that when the individual space 10a attempts to access the object(s) stored in the individual space 10b by an application (not shown) installed on the operating system 102 or under the control of the user, the agent program 104 performs similar operations; hence, the details are not repeated herein.

Two concrete examples are given herein. In the first example, the access request 202 from the individual space 10b intends to modify the object 24a. The agent program 104 determines that the access request 202 is allowed according to the rule 224 of the policy set 12a and then translates the access request 202 into the access request 204. Next, the agent program 104 executes the translated access request 204 in the individual space 10a, which results in the object 24a having been modified. Following that, the agent program 104 synchronizes the object 24a to the storage server 15 through the network interface 113 according to the rule 222 comprised in the policy set 12a. In the second example, an access request 206 from the individual space 10a intends to copy the object 24a into the individual space 10b. The agent program 104 determines that the access request 206 is allowed according to the rule 226 of the policy set 12b and then translates the access request 206 into another access request 208. Then, the agent program 104 executes the translated access request 208 in the individual space 10b (i.e. copies the object 24a from the individual space 10a into the individual space 10b as an object 24b). Next, the agent program 104 synchronizes the object 24b to the storage server 15 through the network interface 113 according to the rule 228 comprised in the policy set 12b.

It some other embodiments, the individual space 10a and/or the individual space 10b may attempt to access a public space (not shown), and vice versa. When these scenarios happen, the operations performed by the agent program 104 are similar to the operations performed by the agent program when the individual space 10a accesses the individual space 10b (or when the individual space 10b access the individual spaces 10a). Therefore, the details are not repeated herein.

From the above descriptions, the agent program 104 in this embodiment monitors every input/output operation intending to access the object(s) stored in the individual spaces 10a, . . . , 10b and determines whether an input/output operation can be performed according to appropriate rule(s) comprised in appropriate policy set(s). Therefore, the agent program 104 can assist users/enterprises using the synchronization apparatus 11 manage their objects (e.g. files and/or folders) in different individual spaces in a secure, flexible, and context-awareness fashion. Diverse, secure, and context-awareness intellectual property management therefore can be achieved.

Figure 3:
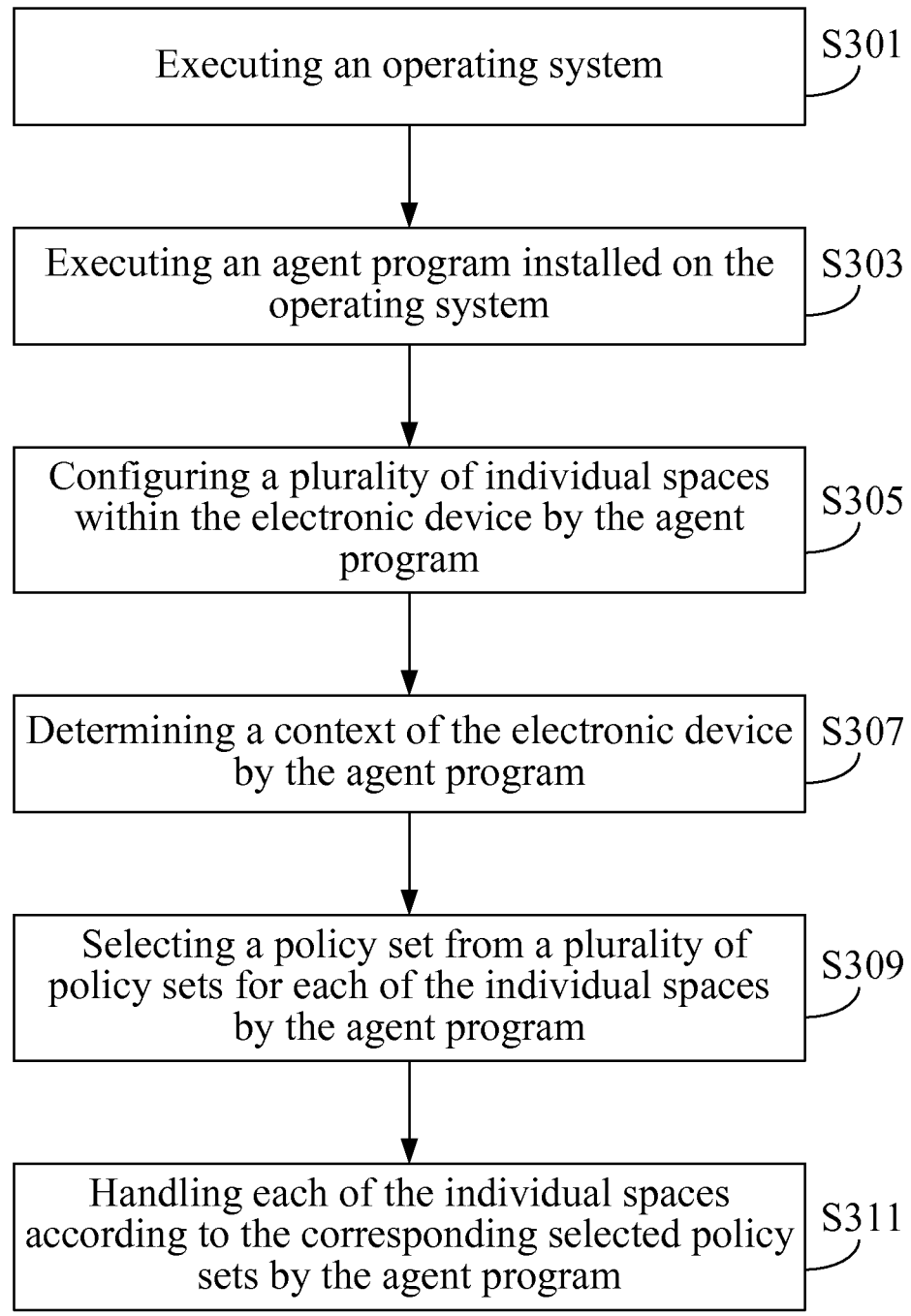
FIG. 3 is a flowchart of the synchronization method of a third embodiment of the present invention.

A third embodiment of the present invention is a synchronization method and a flowchart of which is illustrated in FIG. 3. The synchronization method is for use in an electronic device (e.g. the synchronization apparatus 11 in the first embodiment). The electronic device is electrically connected to a storage server via a network.

First, step S301 is executed by the electronic device for executing an operating system in the electronic device. Next, step S303 is executed by the electronic device for executing an agent program installed on the operating system. Following that, step S305 is executed by the agent program for configuring a plurality of individual spaces (including a first individual space and a second individual space) within the electronic device. It is emphasized that the individual spaces are unaware of each other and are only recognized by the agent program installed on the operating system.

Next, step S307 is executed by the agent program for determining a context of the electronic device. The step S307 may determine the context (not shown) of the electronic device according to at least an interface of the electronic device. In the present invention, an interface of the electronic device is an element, a unit, a device, or the like of the electronic device that can derive a piece of information regarding the environment that the electronic device is placed.

After that, step S309 is executed by the agent program for selecting a policy set from a plurality of policy sets for each of the individual spaces according to the context (including selecting a first and a second policy sets for a first and a second individual spaces respectively). It is noted that the policy sets may be originally stored in the electronic device or synchronized from the storage server to the electronic device by the agent program.

Each of the policy sets comprises a rule regarding synchronization between an individual space and the storage server. For example, the rule may indicate that synchronization between an individual space and the storage server is prohibited. Yet as another example, when an individual space is stored with at least one object and each of the at least one object has a security level, the rule may indicate that the object that has the security level greater than a predetermined threshold should be synchronized to the storage server by the agent program. In addition, when an individual space is stored with an object, the policy set may comprise a rule regarding at least one of a visibility, a read operation, a write operation, a delete operation, and a modify operation of the object. Moreover, each of the policy sets may comprise a rule regarding at least a visibility of an individual space. It is emphasized that different users/enterprises may require different security levels; hence, the content and types of the first and second policy sets may vary from case to case and cannot be listed exhaustively.

Next, step S311 is executed by the agent program for handling each of the individual spaces according to the corresponding selected policy sets (including handling the first individual space and the second individual space according to the first policy set and the second policy set respectively).

In addition to the aforesaid steps, the third embodiment can also execute all the operations and have all functionalities set forth in the first embodiment. The third embodiment executing these operations and having these functionalities will be readily appreciated by those of ordinary skill in the art based on the explanation of the first embodiment, and thus will not be further described herein.

Figure 4A:
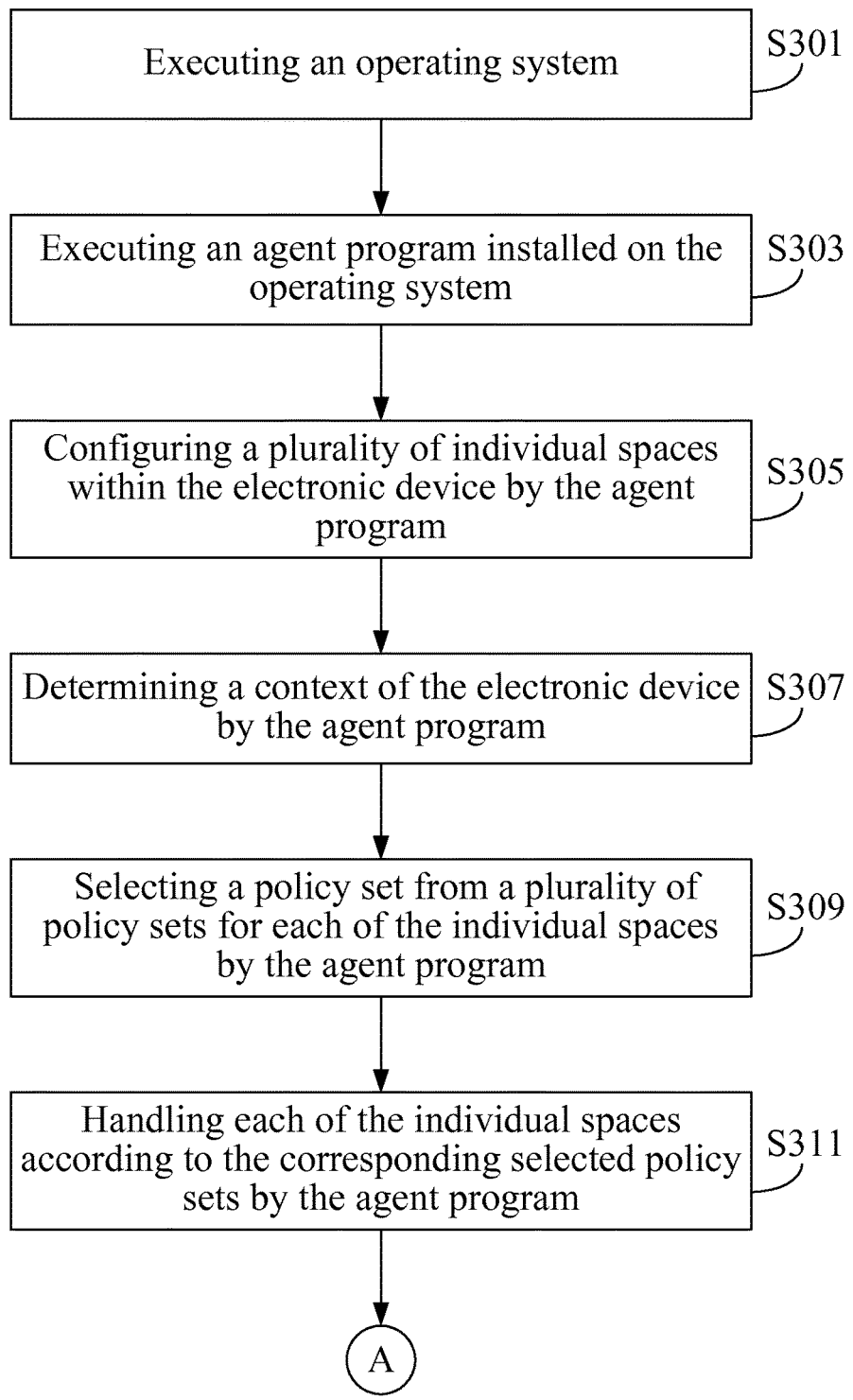
FIG. 4A and FIG. 4B are flowcharts of the synchronization method of a fourth embodiment of the present invention.
Figure 4B:
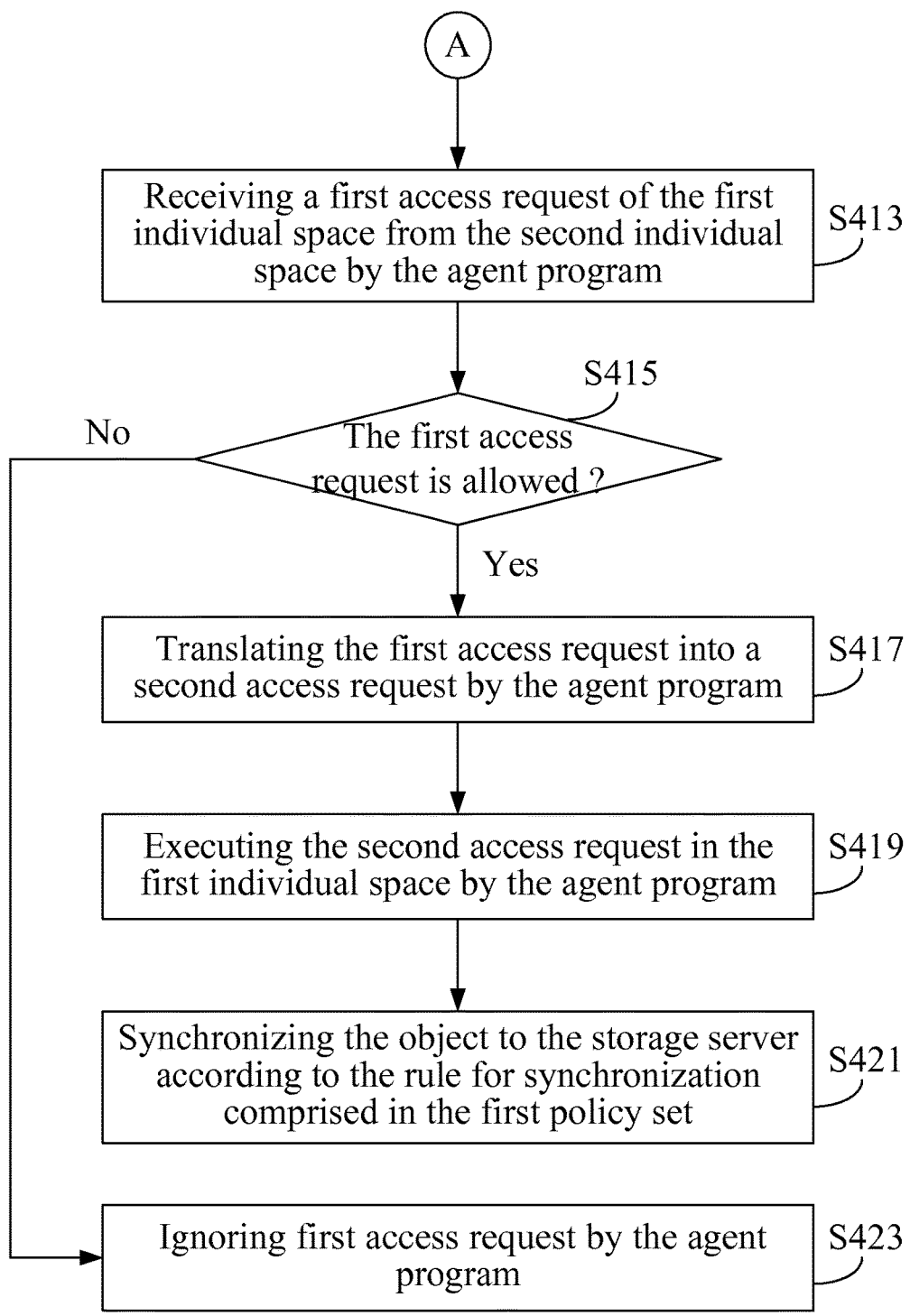

A fourth embodiment of the present invention is a synchronization method and a flowchart of which is illustrated in FIG. 4A and FIG. 4B. The synchronization method is for use in an electronic device (e.g. the synchronization apparatus 11 in the first and second embodiments). The electronic device is electrically connected to a storage server via a network.

In this embodiment, the synchronization method executes step S301 to S311, whose details are not repeated herein. Following that, step S413 is executed by the agent program for receiving a first access request of the first individual space from the second individual space. Next, step S415 is executed by the agent program for determining whether the first access request is allowed according to the first policy set. If the first access request is allowed, step S417 is executed by the agent program for translating the first access request into a second access request. Following that, step S419 is executed by the agent program for executing the second access request in the first individual space.

After the execution of the step S419, the agent program derives an execution result. In some embodiments, the first individual space is stored with an object and the execution result is that the object has been modified. For these embodiments, step S421 may be further executed by the agent program for synchronizing the object to the storage server according to the rule for synchronization comprised in the first policy set. If the step S415 determines that the first access request is not allowed, step S423 is executed by the agent program for ignoring the first access request. Yet in some other embodiments, the first individual space is stored with a first object and the execution result is that the first object is copied from the first individual space to the second individual space as a second object. For these embodiments, another step (not shown) is executed by the agent program for synchronizing the second object to the storage server according to the rule for synchronization comprised in the second policy set.

The aforementioned steps S413 to S423 are written from the viewpoint of the first individual spaces; that is, when the first individual space is accessed. Nevertheless, in some other embodiments, the second individual space could be accessed by other individual space(s) as well. People ordinary skilled in the art should be able to conceive the steps to be executed for those embodiments based on the descriptions of the steps S413 to S423. Yet in some other embodiments, the first/second individual space(s) may be accessed by a public space, and vice versa. Similarly, people ordinary skilled in the art should be able to conceive the steps to be executed for those embodiments based on the descriptions of the steps S413 to S423. Therefore, the details for those embodiments are not repeated herein.

In addition to the aforesaid steps, the fourth embodiment can also execute all the operations and have all functionalities set forth in the second embodiment. The fourth embodiment executing these operations and having these functionalities will be readily appreciated by those of ordinary skill in the art based on the explanation of the second embodiment, and thus will not be further described herein.

The synchronization methods described in the third and fourth embodiments may be implemented by a computer program having a plurality of codes. The computer program is a computer program product that can be stored in a non-transitory computer readable storage medium. When the codes are loaded into an electronic device (e.g. the synchronization apparatus 11 in the first and second embodiments), the computer program executes the synchronization methods as described in the third and fourth embodiments.

The non-transitory computer readable storage medium may be an electronic product, such as a read only memory (ROM), a flash memory, a floppy disk, a hard disk, a compact disk (CD), a mobile disk, a magnetic tape, a database accessible to networks, or any other storage media with the same function and well known to those skilled in the art.

According to the above descriptions, the present invention has an agent program installed and executed on an operating system within a synchronization apparatus (or electronic device). The agent program configures a plurality of individual spaces in the synchronization apparatus (or electronic device), wherein the individual spaces are unaware of each other and only recognized by the agent program. The agent program determines a context of the synchronization apparatus (or electronic device) that is installed with the agent program. From the viewpoint of all the individual spaces, different individual spaces in the synchronization apparatus (or electronic device) may correspond to different policy sets under the same context. From the viewpoint of one single individual space, an individual space may correspond to different policy sets under different contexts.

The agent program selects a policy set for each of the individual spaces according to the context. Each of the policy sets comprises a rule regarding synchronization between an individual space and the storage server. Afterwards, the agent program handles each of the individual spaces according to the selected corresponding policy set.

The agent program may further monitor every input/output operation intending to access the individual spaces and determine whether an input/output operation can be performed according to appropriate rule(s) comprised in appropriate policy set(s). Therefore, the agent program can assist users/enterprises using the synchronization apparatus (or electronic device) manage their objects (e.g. files and/or folders) in different individual spaces in a secure, flexible, and context-awareness fashion. As a result, diverse, secure, and context-awareness intellectual property management can be achieved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A synchronization apparatus, comprising:
   a storage unit, stored with a plurality of policy sets;
   a network interface, electrically connected to a storage server via a network; and
   a processing unit, electrically connected to the storage unit and the network interface and configured to execute an operating system and execute an agent program installed on the operating system, the agent program configuring a first individual space and a second individual space within the storage unit, determining a context of the synchronization apparatus, selecting a first policy set and a second policy set from the policy sets for the first individual space and the second individual space according to the context respectively, and handling the first individual space and the second individual space according to the first policy set and the second policy set respectively;

wherein the first individual space and the second individual space are only recognized by the agent program installed on the operating system, the first individual space and the second individual space are unaware of each other, the first policy set comprises a first rule regarding synchronization between the first individual space and the storage server, and the second policy set comprises a second rule regarding synchronization between the second individual space and the storage server.

2. The synchronization apparatus of claim 1, wherein the first rule indicates that synchronization between the first individual space and the storage server is prohibited.

3. The synchronization apparatus of claim 1, wherein the first individual space is stored with at least one object, each of the at least one object has a security level, and the first rule indicates that the object that has the security level greater than a predetermined threshold will be synchronized to the storage server by the agent program through the network interface.

4. The synchronization apparatus of claim 1, wherein the agent program receives a first access request of the first individual space from the second individual space, the agent program determines that the first access request is allowed according to the first policy set, the agent program translates the first access request into a second access request, the agent program executes the second access request in the first individual space, and the agent program derives an execution result after executing the second access request.

5. The synchronization apparatus of claim 4, wherein the first individual space is stored with an object, the execution result is that the object has been modified, and the agent program synchronizes the object to the storage server through the network interface according to the first rule.

6. The synchronization apparatus of claim 4, wherein the first individual space is stored with a first object, the execution result is that the first object is copied from the first individual space to the second individual space as a second object, and the agent program synchronizes the second object to the storage server through the network interface according to the second rule.

7. The synchronization apparatus of claim 1, wherein the agent program receives a first access request of the first individual space from a public space, the public space is outside the first individual space and the second individual space but with the storage unit, the agent program determines that the first access request is allowed according to the first policy set, the agent program translates the first access request into a second access request, the agent program executes the second access request in the first individual space, and the agent program derives an execution result after executing the second access request.

8. The synchronization apparatus of claim 1, wherein the policy sets are synchronized from the storage server to the storage unit by the agent program through the network interface.

9. The synchronization apparatus of claim 1, wherein the first individual space is stored with an object, the first policy set is related to at least one of a visibility, a read operation, a write operation, a delete operation, and a modify operation of the object.

10. The synchronization apparatus of claim 1, wherein the first policy set is related to at least a visibility of the first individual space.

11. A synchronization method for use in an electronic device, the electronic device being electrically connected to a storage server via a network, the synchronization method comprising:
   executing an operating system;
   executing an agent program installed on the operating system;
   configuring a first individual space and a second individual space within the electronic device by the agent program;
   determining a context of the electronic device by the agent program;
   selecting a first policy set and a second policy set from a plurality of policy sets for the first individual space and the second individual space according to the context respectively by the agent program; and
   handling the first individual space and the second individual space according to the first policy set and the second policy set respectively by the agent program;
   wherein the first individual space and the second individual space are only recognized by the agent program installed on the operating system, the first individual space and the second individual space are unaware of each other, the first policy set comprises a first rule regarding synchronization between the first individual space and the storage server, and the second policy set comprises a second rule regarding synchronization between the second individual space and the storage server.

12. The synchronization method of claim 11, wherein the first rule indicates that synchronization between the first individual space and the storage server is prohibited.

13. The synchronization method of claim 11, wherein the first individual space is stored with at least one object, each of the at least one object has a security level, and the first rule indicates that the object that has the security level greater than a predetermined threshold will be synchronized to the storage server by the agent program.

14. The synchronization method of claim 11, further comprising:
   receiving a first access request of the first individual space from the second individual space by the agent program;
   determining that the first access request is allowed according to the first policy set by the agent program;
   translating the first access request into a second access request by the agent program;
   executing the second access request in the first individual space by the agent program; and
   deriving an execution result after executing the second access request by the agent program.

15. The synchronization method of claim 14, wherein the first individual space is stored with an object, the execution result is that the object has been modified, and the synchronization method further comprising:
   synchronizing the object to the storage server according to the first rule by the agent program.

16. The synchronization method of claim 14, wherein the first individual space is stored with a first object, the execution result is that the first object is copied from the first individual space to the second individual space as a second object, and the synchronization method further comprising:
   synchronizing the second object to the storage server according to the second rule by the agent program.

17. The synchronization method of claim 11, further comprising:
   receiving a first access request of the first individual space from a public space by the agent program, wherein the public space is outside the first individual space and the second individual space but with the storage unit;

determining that the first access request is allowed according to the first policy set;

translating the first access request into a second access request by the agent program;

executing the second access request in the first individual space by the agent program; and deriving an execution result after executing the second access request by the agent program.

18. The synchronization method of claim 11, wherein the policy sets are synchronized from the storage server to the electronic device by the agent program.

19. The synchronization method of claim 11, wherein the first individual space is stored with an object, the first policy set is related to at least one of a visibility, a read operation, a write operation, a delete operation, and a modify operation of the object.

20. The synchronization method of claim 11, wherein the first policy set is related to at least a visibility of the first individual space.

21. A non-transitory computer readable storage medium, having a computer program stored therein, the computer program executing a synchronization method after being loaded into an electronic device, the electronic device being electrically connected to a storage server via a network, the synchronization method comprising:

executing an operating system;

executing an agent program installed on the operating system;

configuring a first individual space and a second individual space within the electronic device by the agent program;

determining a context of the electronic device by the agent program;

selecting a first policy set and a second policy set from a plurality of policy sets for the first individual space and the second individual space according to the context respectively by the agent program; and handling the first individual space and the second individual space according to the first policy set and the second policy set respectively by the agent program;

wherein the first individual space and the second individual space are only recognized by the agent program installed on the operating system, the first individual space and the second individual space are unaware of each other, the first policy set comprises a first rule regarding synchronization between the first individual space and the storage server, and the second policy set comprises a second rule regarding synchronization between the second individual space and the storage server.

* * * * *